United States Patent

Bullen

[11] Patent Number: 5,507,091
[45] Date of Patent: Apr. 16, 1996

[54] MECHANIZED ASSEMBLY WORK CELL

[75] Inventor: George N. Bullen, Oxnard, Calif.

[73] Assignee: Northrop Grumman Corporation, Los Angeles, Calif.

[21] Appl. No.: 414,244

[22] Filed: Mar. 31, 1995

Related U.S. Application Data

[63] Continuation-in-part of Ser. No. 182,992, Jan. 14, 1994, abandoned.

[51] Int. Cl.$^6$ .................................................. B23P 21/00
[52] U.S. Cl. ............................ 29/714; 29/809; 29/281.1; 269/290
[58] Field of Search ........................... 29/714, 809, 823, 29/281.6, 50, 565, 281.1; 269/1, 290

[56] References Cited

U.S. PATENT DOCUMENTS

| | | | |
|---|---|---|---|
| 3,543,375 | 12/1970 | Williamson et al. | 29/714 |
| 3,550,245 | 12/1970 | Davis | 269/290 |
| 4,203,204 | 5/1980 | Murphy | 29/703 |
| 4,310,964 | 1/1982 | Murphy | 29/469 |
| 4,641,819 | 2/1987 | Poland | 29/281.6 |
| 4,821,408 | 4/1989 | Speller, Sr. et al. | 29/701 |
| 4,885,836 | 12/1989 | Bonomi et al. | 29/524.1 |
| 4,966,323 | 10/1990 | Speller, Sr. et al. | 227/51 |
| 5,105,515 | 4/1992 | Nelson | 29/281.3 |
| 5,142,764 | 9/1992 | Whiteside | 29/559 |
| 5,150,624 | 9/1992 | Kaczmarek et al. | 73/865.9 |
| 5,220,718 | 6/1993 | Speller, Sr. et al. | 29/431 |

FOREIGN PATENT DOCUMENTS

92/14582  9/1992  WIPO.

*Primary Examiner*—David P. Bryant
*Attorney, Agent, or Firm*—Terry J. Anderson; Karl J. Hoch, Jr.

[57] ABSTRACT

The invention is embodied in a tooling jig system, which includes an alignment frame having plural fiducial fastening devices at spaced locations thereon and a conveyor guide extending along a length of the alignment frame a magazine adjacent the alignment frame, including a magazine conveyor guide in alignment with the conveyor guide of the alignment frame, a conveyor frame including guide apparatus for confining movement of the conveyor frame along a line of travel coincident with the conveyor guides of the magazine and alignment frames during travel of the conveyor frame from the magazine to the alignment frame, plural fiducial fastening devices at spaced locations on the conveyor frame, and apparatus for moving the conveyor frame from a starting location in the magazine to an end-of-travel location in the alignment frame.

14 Claims, 5 Drawing Sheets

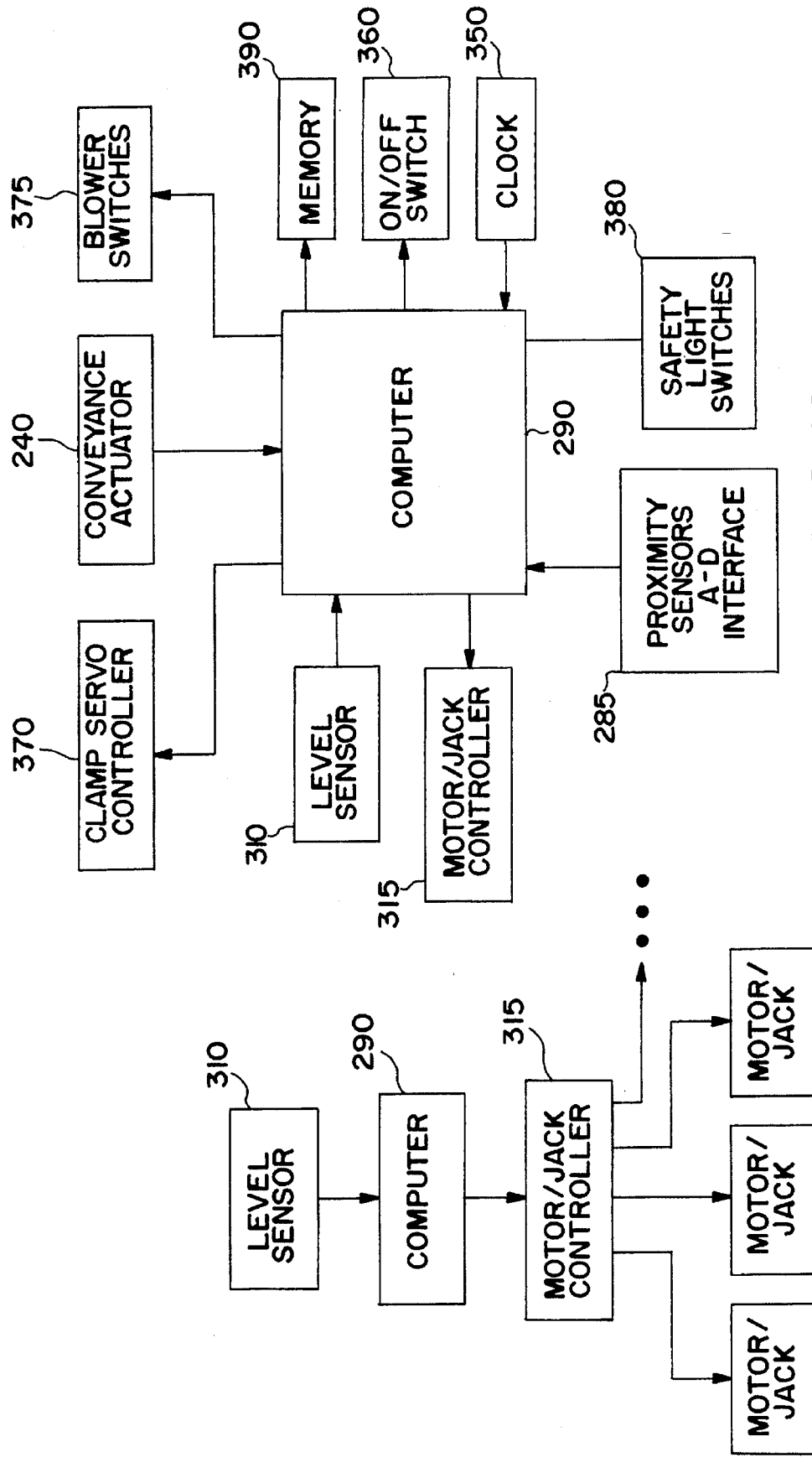

MECHANIZED ASSEMBLY WORK CELL

CROSS-REFERENCE TO RELATED APPLICATION

This application is a continuation-in-part of commonly-assigned patent application Ser. No. 08/182,992 filed on Jan. 14, 1994, now abandoned.

BACKGROUND OF THE INVENTION

1. Technical Field

The invention relates to apparatus for aligning tooling details, such as drill bonnets and the like, with a product detail, such as a section of an aircraft wing, during manufacture.

2. Background Art

In current aerospace industry practice, aircraft assemblies are manufactured by placing individual piece parts, or details, of the assembly in an assembly jig and performing one or more operations (such as drilling or riveting) on the inserted details. The individual piece parts or details are located and held in place by tools which are secured to the assembly jig. It is often necessary to remove one set of tools and install another set to manufacture another section of the assembly or to perform a different operation on the section of the assembly previously manufactured.

Because the tools required to manufacture an assembly are installed and removed manually, they are necessarily limited in size and weight so that shop personnel can lift and position them on the assembly jig. As a result, numerous separate tools are required to complete the manufacture of even small and non-complex aircraft assemblies, and the manufacturing process is labor-intensive, time consuming and costly. Additionally, although the tools are secured to the assembly jig in predetermined positions, the dimensional tolerances on individual locating and fastener holes for the plurality of tools used in an assembly operation make it impossible to insure that one aircraft assembly is dimensionally identical to another produced on the same jig. Because of the number of tools involved, it is not practical to verify tool alignment for manufacturing each assembly, and such alignment is typically verified only after some pre-established period of time, such as six months. Additionally, the assembly jig itself must be periodically surveyed to verify it is level. These operations are also time consuming, labor intensive, and costly.

SUMMARY OF THE DISCLOSURE

The invention is embodied in a tooling jig system, which includes an alignment frame having plural fiducial fastening devices at spaced locations thereon and a conveyor guide extending along a length of the alignment frame a magazine adjacent the alignment frame, including a magazine conveyor guide in alignment with the conveyor guide of the alignment frame, a conveyor frame including guide apparatus for confining movement of the conveyor frame along a line of travel coincident with the conveyor guides of the magazine and alignment frames during travel of the conveyor frame from the magazine to the alignment frame, plural fiducial fastening devices at spaced locations on the conveyor frame, and apparatus for moving the conveyor frame from a starting location in the magazine to an end-of-travel location in the alignment frame.

The fiducial fastening devices on the alignment frame preferably include apparatus for fastening a product detail onto the alignment frame, and the fiducial fastening devices on the conveyor frame preferably include apparatus for fastening a tooling detail onto the conveyor frame. The apparatus for fastening of the alignment frame preferably include bolt holes in the alignment frame and bolts insertable through the bolt holes and through matching bolt holes in a product detail on the alignment frame, and the apparatus for fastening of the conveyor frame include bolt holes in the conveyor frame and bolts insertable through the bolt holes and through matching bolt holes in a tooling detail on the conveyor frame.

The tooling jig system preferably includes apparatus for detecting a proximity of the conveyor jig to an initial end-of-travel position thereof relative to the alignment frame. The apparatus for detecting detects a proximity of the conveyor jig along each one of plural mutually orthogonal directions. Preferably, clamp apparatus fastens the conveyor frame to its end-of-travel position relative to the alignment frame. Sensing apparatus responsive to the proximity detecting apparatus disables the clamp apparatus upon detection of an out-of-tolerance end-of-travel position.

A floor is fastened to the alignment frame and a blower generates a downdraft across working planes of the alignment frame. The downdraft is collected in the floor and filtered. Movable jacks support the magazine and alignment frame, a level sensor is attached to the alignment frame and a controller adjusts the movable jacks so as to null an error signal generated by the level sensor. The end-of-travel position is on a side of the alignment frame opposite the magazine, the system further including a second magazine having a conveyor guide therein aligned with and merging with the conveyor guide of the alignment frame, the second magazine including a second conveyor frame including second guide apparatus for confining movement of the second conveyor frame along a line of travel coincident with the conveyor guides of the second magazine and alignment frames during travel of the second conveyor frame from the second magazine to the alignment frame, plural fiducial fastening devices at spaced locations on the second conveyor frame, and apparatus for moving the second conveyor frame from a starting location in the second magazine to an end-of-travel location in the alignment frame. The floor tilts upwardly to expose removable air filters. Successive proximity deviations from an initial end-of-travel position of the conveyor frame relative to the alignment frame are recorded to predict occurrence of out-of-tolerance conditions.

BRIEF DESCRIPTION OF THE DRAWINGS

FIG. 6 is a block diagram illustrating a self-leveling control system of the invention.

FIG. 10 is a block diagram illustrating an integrated control system governing the assembly work cell of FIG. 1.

DETAILED DESCRIPTION OF THE PREFERRED EMBODIMENT

The present invention solves the problems encountered in the prior art by providing a mechanized assembly work cell. In the present invention, the assembly jig is formed as part of a frame. The frame also includes an overhead conveyor, similar to the track of a garage door opener, which extends from the assembly jig to a separate section of the frame (a "magazine") where one or more manufacturing tools are stored. When activated by manufacturing personnel, the conveyor delivers the selected assembly tool to the assembly area of the frame jig. Upon reaching its predetermined position, the selected assembly tool is locked into position by clamps, either automatically or by manual command, and the position of the tool is verified automatically by electrical sensors. Manufacturing personnel then perform the desired manufacturing operation such as positioning and fastening details together, drilling, "stuffing" the assembly with aircraft components, and so forth.

Because the tool is moved and positioned by the conveyor, the tool is large and its size is limited only by the load carrying capacity of the conveyor. The invention therefore eliminates most if not all of the separate, individual tools used to manufacture an aircraft assembly, significantly reduces the labor effort involved, and produces assemblies with improved dimensional accuracy and uniformity.

When a particular operation is completed the conveyor is again operated to return the tool to the "magazine." The tool needed for the next operation is attached, manually or by mechanisms, to the conveyor, delivered to the assembly jig area, and positioned. The next operation is then performed, and the process repeated until the assembly is completed. The frame is also provided with leveling sensors to insure that it is level at all times.

Figure 1:
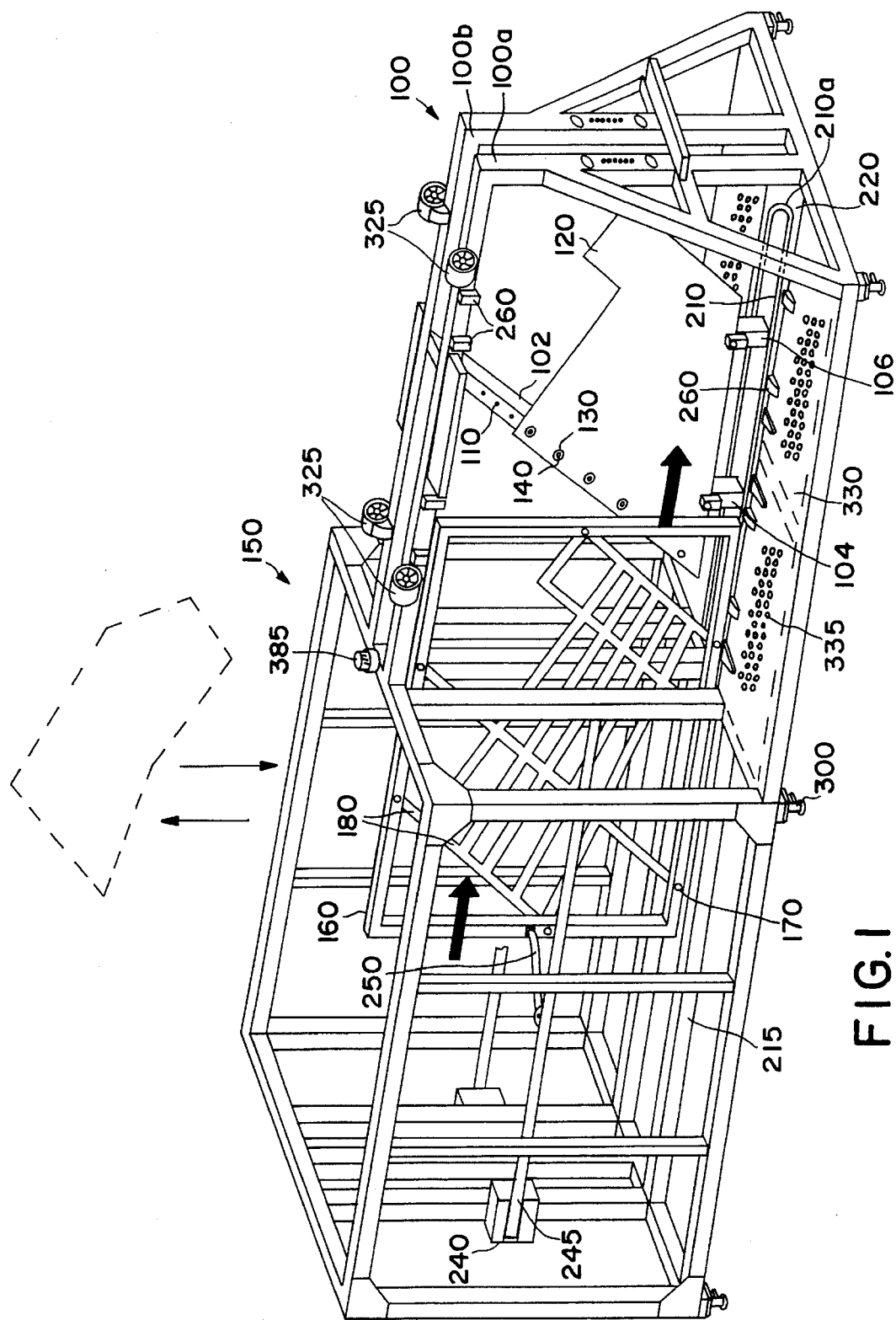
FIG. 1 is a perspective view of an assembly work cell embodying the present invention.
Figure 2:
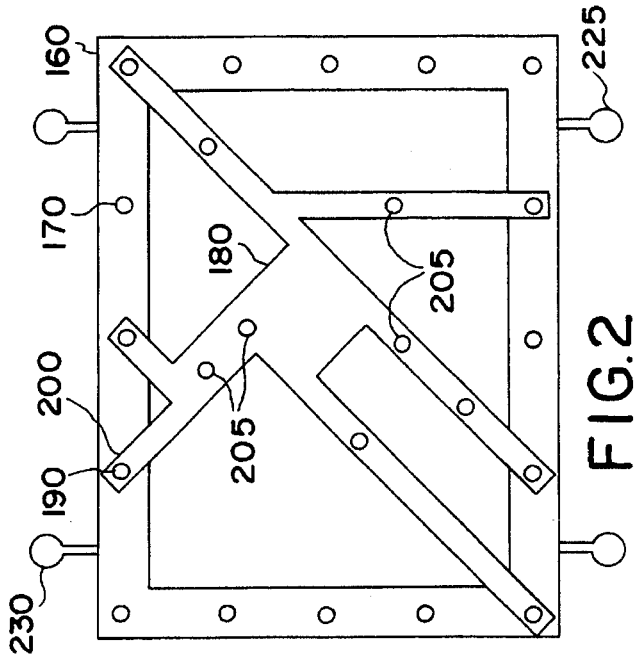
FIG. 2 is a side view of a tooling jig of the assembly work cell of FIG. 1.

Referring to FIGS. 1 and 2, a rectangular alignment frame 100 has precisely located fiducial holes 110 at periodic locations in member 102, which extends downwardly from between top arms 100a and 100b of alignment frame 100. Member 102 as shown is a generally L-shaped member which extends downwardly behind product detail 120 with a base portion (not shown) attached to legs 104 and 106 which are secured to bottom arm 220 of alignment frame 100.

In a preferred embodiment, member 102 and legs 104 and 106 are removably attached to alignment frame 100 with precision attachment pins (not shown) inserted through selected ones of precision milled holes (not shown) in top arms 100a and 100b and bottom arm 220 of alignment frame 100 so that member 102 and legs 104 and 106 can be moved laterally within alignment frame 100 to accommodate a variety of product details 120.

It will be understood that the shape of member 102 and its location within alignment frame 100, and the location of legs 104 and 106, will be determined by the shape of the product detail 120 being manufactured. In other embodiments, member 102 and legs 104 and 106 can be permanently secured to alignment frame 100 by conventional fasteners, welding, or bonding.

The fiducial holes 110 are preferably milled using highest precision milling apparatus to establish their periodic locations relative to the alignment frame 100 to within ±0.0001 inch. The product detail 120, which may be a partially finished wing section, for example, has milled fiducial holes 130 at locations corresponding to selected ones of the alignment frame fiducial holes 110. The product detail fiducial holes 130 are centered on the alignment frame fiducial holes 110 by bolts 140 inserted therethrough. The product detail fiducial holes 130 are precisely milled so as to establish their locations to within ±0.0001 inch. In this way, the product detail 120 is located and oriented relative to the alignment frame 100 to within ±0.0002 inch.

A magazine 150 stores a rectangular conveyor frame 160 having fiducial holes 170 at periodic locations which are precisely milled to establish their locations relative to the conveyor frame 160 to within ±0.0001 inch. A tooling detail 180 has fiducial holes 190 (best shown in FIG. 2) at locations corresponding to selected ones of the conveyor frame fiducial holes 170. The tooling detail fiducial holes 190 are centered on the conveyor frame fiducial holes 170 by bolts 200 inserted therethrough. The tooling detail fiducial holes 190 are precisely milled so as to establish their locations to within ±0.0001 inch. In this way, the tooling detail 170 is located and oriented relative to the conveyor frame 160 to within ±0.0002 inch.

The tooling detail 180 may be, for example, a drill bonnet for the product detail 120, the tooling detail having many precisely located milled guide holes 205 at various accurately predetermined locations. Unlike the prior art, such a drill bonnet can cover and locate guide holes across the entire face of the product detail, regardless of its extent.

Various tooling details may be efficiently removed and replaced by overhead cranes (not shown) through the top of the magazine 150, in the manner indicated in phantom line in FIG. 1. For this purpose, the magazine may hold a number of tooling details, which are placed at different times into the conveyor frame 160 by overhead cranes (not shown) as the need arises.

Tooling details 180 are normally stored in magazine 150, but may alternatively be stored at a remote location and brought therefrom to be placed on conveyor frame 160 as needed, or a combination of internal magazine storage and remote storage can be employed. Thus, many different operations may be carried out on the product detail 120 after it has been fastened in place in the alignment frame 100.

A conventional conveyor guide rail 210 extends along a bottom center arm 215 of the magazine 150. The rail 210 continues along the bottom arm 220 of the alignment frame 100. The conveyor frame 160 rides on rail guides 225 (FIG. 2) which are constrained inside the center of the rail 210. Similarly, two rail guides 230 (FIG. 2) on the top of the conveyor frame ride in and are constrained inside the center of a top rail (not shown) in the top arm 100a of the alignment frame 100. A conventional conveyance actuator 240 and conveyor rail 245 with a moving chain (not shown) and wrist 250 move the conveyor frame 160 back and forth along the guide rail 210.

In the preferred embodiment shown, magazine 150 includes two conveyance actuators 240, conveyor rails 245, and conveyor frames 160 which are moved into position on opposing sides of product detail 120 on U-shaped guide rail 210, with the second conveyor rail being shown only partially and the second conveyor frame 160 being omitted for clarity.

The guide rail 210 terminates at an end 210a which precisely locates the conveyor frame 160 at its end of travel relative to the alignment frame 100. Pneumatically operated clamp servos or two-way throw clamps 260 (of the type sold under the trademark DeStaco) located along the top and bottom arms of the alignment frame 100 can be actuated to lock the conveyor frame 160 into its end-of-travel position relative to the alignment frame 100. The clamp servos 260 squeeze the conveyor frame 160 against adjacent surfaces of the adjustment frame 100. In the preferred embodiment, the guide rail 210 firmly holds the rail guides 225 in the same end-of-travel position every time the conveyor frame 160 reaches its end of travel, to within ±0.0001 inch.

Figure 4:
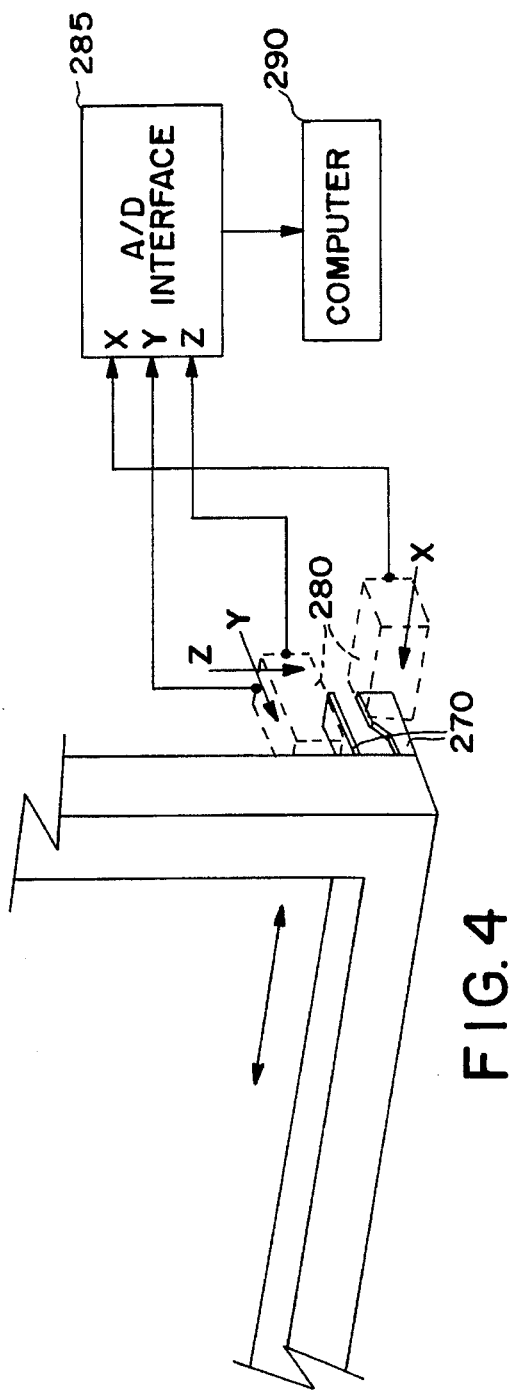
FIG. 4 is a perspective view of a portion of the assembly work cell of FIG. 1 illustrating the location of displacement sensors thereon.

In order to ensure precise alignment of the conveyor frame 160 at its end of travel relative to the alignment frame 100, proximity flags 270 shown in FIG. 4 rigidly mounted on the conveyor frame 160 are monitored by proximity sensors 280 precisely located on and rigidly attached to the alignment frame 100. The proximity sensors 280 are located so as to face the proximity flags 270 whenever the conveyor frame 160 is its end of travel. The proximity sensors 280 measure position of the conveyor frame 160 relative to the alignment frame along all three orthogonal axes X, Y, Z to within ±0.0001 inch. As illustrated in FIG. 4, the proximity sensors 280 are connected through an A/D interface 285 to a computer 290. The computer 290 is programmed to monitor successive end-of-travel positions of the conveyor frame 160 and guard against deviations from the original position over many successive trips of the conveyor frame 160 between the magazine 150 and the alignment frame 100.

As a result, as successive different tooling details are attached to the conveyor frame 160 and moved to the product detail 120, their end-of-travel alignment and position relative thereto are always the same. In other words, the conveyor frame fiducial holes 170 are always in the same position relative to the alignment fiducial holes 110 at the conveyor frame end-of-travel position each time a new tooling detail is conveyed to the alignment frame 100, to within ±0.0004 inch. This permits successive tool details to be automatically aligned with the same product detail repetitively and reliably.

Figure 5A:
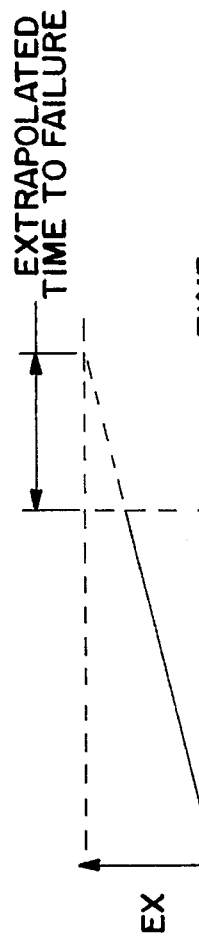
FIGS. 5A, 5B and 5C illustrate the time behavior of measurements through the sensors of FIG. 4.
Figure 5B:
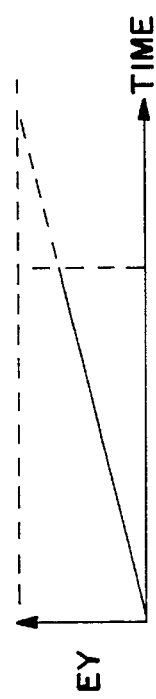
Figure 5C:
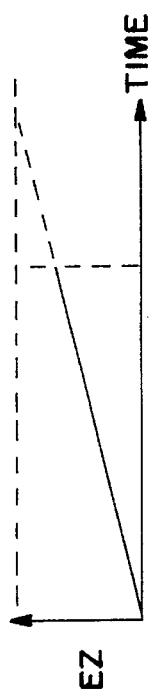

In one embodiment, the computer 290 is programmed to record the locations of the proximity flags 270 upon the first time the conveyor frame 160 reaches its end of travel and then to record deviations of all subsequent end-of-travel positions of the proximity flags 270 from the original position, and store the deviations in memory so as to build a deviation histogram for each of the three orthogonal axes X,Y,Z, as illustrated in the graphs of FIGS. 5A–5C. The computer 290 can be further programmed to extrapolate from the previous position deviation data (corresponding to the solid-line graphs of FIGS. 5A–5C) to a deviation tolerance limit (horizontal dashed line of FIG. 5A) in order to predict the time remaining ("extrapolated time to failure") before the limit is exceeded. This allows planning far ahead for periodic production shut-downs to adjust the conveyor frame alignment, a significant advantage. It also prevents manufacture of out-of-tolerance products.

In an alternative (but not currently preferred) embodiment, the conveyor actuator 240 can be of the type whose end-of-travel position can be electronically altered. In this case, the computer 290 would control the electronic adjustment of the end-of-travel position of the conveyor actuator so as to minimize the deviation measured by the proximity sensors 280.

In any case, the accuracy of the relative end-of-travel locations of the conveyor frame fiducial holes 170 and the alignment frame fiducial holes is not so important as the ability of the system to reproduce those same locations time after time to within ±0.0004 inch. In this way, successive tooling details for different operations are placed against the same product detail with the same alignment across the entire face of the product detail.

The alignment frame 100 and magazine 150 are fastened together as shown in FIG. 1, the entire frame thereof being a rigid self-leveling platform. This is facilitated by floating the entire platform on jack assemblies 300 having electric motors therein for adjusting the vertical height of the jack 300. Referring to FIG. 6, a 3-axis level sensor 310 rigidly attached to the alignment frame 100 has outputs (indicating 3-axis level orientation) connected to the computer 290. The computer 290 deduces from three outputs of the level sensor 310 the exact orientation of the alignment frame 100 relative to horizontal and further deduces an adjustment for each one of the jacks 300 to correct for any deviation from a level alignment. The computer 290 controls a motor/jack controller 315 which in turn governs all of the motor/jack assemblies 300.

Figure 7:
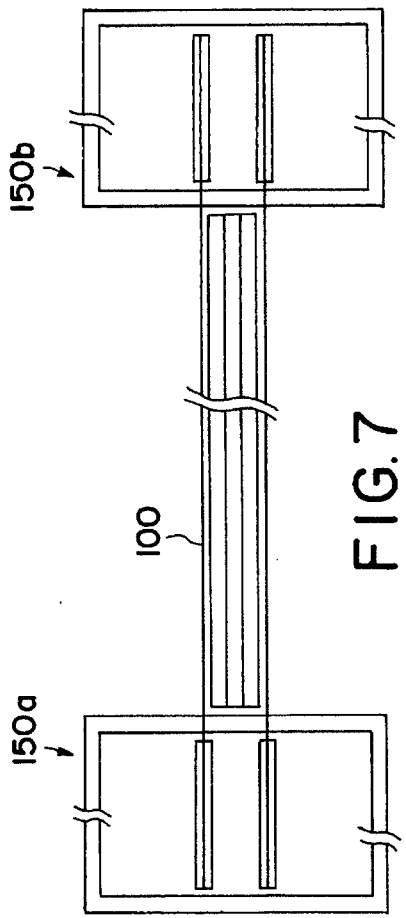
FIG. 7 is an overhead view of an alternative embodiment of the invention employing a pair of tooling detail magazines.

FIG. 7 illustrates an alternative embodiment in which a pair of magazines 150a, 150b are located on each end of the alignment frame, so that while a tooling detail in one magazine is being changed, the other magazine furnishes a tooling detail to the alignment frame, for maximum production throughput.

Figure 8:
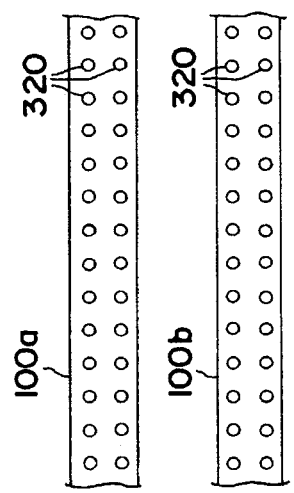
FIG. 8 is a bottom view of a portion of the assembly work cell of FIG. 1 illustrating air passages in a portion thereof in an air circulation system of the invention.

FIG. 8 illustrates air vent holes 320 in the bottom surface of the top arms 100a, 100b of the alignment frame 100. The alignment frame 100 has hollow arms, and the interior thereof is pressurized with air by electric blowers 325, so that air rushes out of the bottom holes 325 toward the floor 330 of the alignment frame. Suction holes 335 in the floor 330 are in registration with the blower holes 320 in the overlying arms 100a, 100b to preclude intrusion of contaminants into the work area and to continuously purge the work area from dust and debris produced by manufacturing operations, such as drilling or grinding, on the product detail 120.

Figure 9:
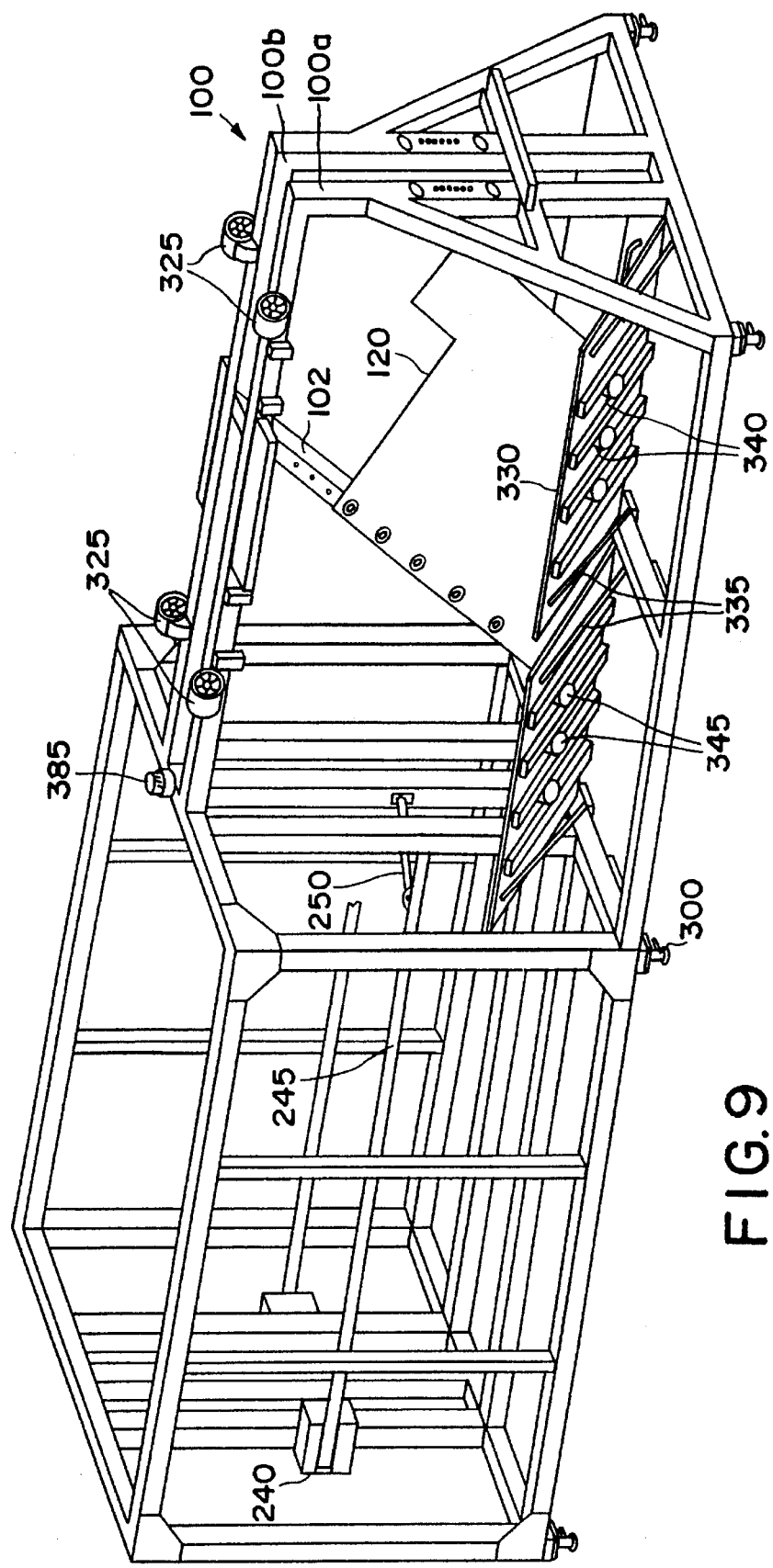
FIG. 9 is a perspective view corresponding to FIG. 1 illustrating how access is given to the air circulation system.

As illustrated in FIG. 9, the floors 330 may be opened upwardly, with gas shocks 335 providing easy lift, to reveal electric suction compressors 340 thereunder. The air filters 345 placed in the outflow of the suction compressors 340 are readily removed and replaced in the manner illustrated in FIG. 9.

Figure 3:
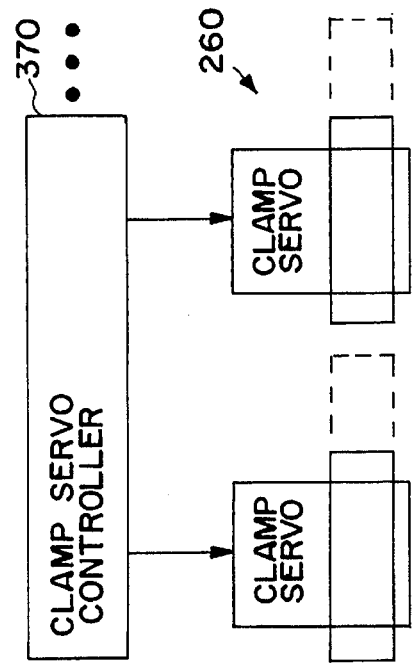
FIG. 3 is a block diagram of the clamp servos and their controller.

FIG. 10 illustrates how the computer 290 acts as a system integration controller. The computer 290 receives inputs from the level sensor 310, the proximity sensor A/D interface 285, a clock 350 and an on/off switch 360 operated by the user. The computer 290 has output ports coupled to the conveyance actuator 240, a clamp servo controller 370 governing all of the clamps 260 (as shown in FIG. 3), the jack controller 315, blower switches 375 controlling power to the electric blowers 325, a safety light switch 380 controlling power to a rotating safety light 385 and a memory 390.

A separate switch or the computer 290 itself can activate the conveyor servo 240 to bring the conveyor frame from the magazine 150 to the alignment frame 100. Preferably, the computer 290 is programmed to react to closure of the on/off switch 360 by closing the blower switches 375, closing the safety light switch 380 and then, after a predetermined time measured by the clock 350, activating the clamp servo controller 370. During the predetermined time, the computer 290 queries the proximity sensor A/D interface 285 to make sure that the conveyor frame end-of-travel position is within tolerance. Otherwise, the computer 290 refuses to activate the clamp servo controller 370. The computer 290 is further programmed to store the histogrammic position deviation data of FIGS. 5A–5C in the memory 390 for further evaluation, or for use by the computer 290 in predicting an extrapolated time-to-failure.

Preferably, the magazine 150 and the alignment frame 100 are made of pultruded graphite tubing, which provides the advantages of quietness, lightness, strength and lack of necessity of welding during construction. Another advantage is that with this type of material, the magazine and alignment frame may be constructed modularly and provided with foldable disassembly features which permit rapid transport.

While the invention has been described in detail by specific reference to preferred embodiments, it is understood that variations and modifications may be made without departing from the true spirit and scope of the invention.

What is claimed is:

1. A tooling jig system, comprising:
   an alignment frame having plural fiducial fastening devices at spaced locations thereon and a conveyor guide extending along a length of said alignment frame; and,
   a magazine adjacent said alignment frame, comprising:
   a magazine conveyor guide in alignment with the conveyor guide of said alignment frame,
   a conveyor frame including guide means for confining movement of said conveyor frame along a line of travel coincident with the conveyor guides of said magazine and alignment frame during travel of said conveyor frame from said magazine to said alignment frame,
   plural fiducial fastening devices at spaced locations on said conveyor frame, and
   means for moving said conveyor frame from a starting location in said magazine to an end-of-travel location in said alignment frame.

2. The tooling jig system of claim 1 wherein:
   said fiducial fastening devices on said alignment frame comprise means for fastening a product detail onto said alignment frame, and
   said fiducial fastening devices on said conveyor frame comprise means for fastening a tooling detail onto said conveyor frame.

3. The tooling jig system of claim 2 wherein:
   said means for fastening of said alignment frame comprise bolt holes in said alignment frame and bolts insertable through said bolt holes and through matching bolt holes in a product detail on said alignment frame, and
   said means for fastening of said conveyor frame comprise bolt holes in said conveyor frame and bolts insertable through said bolt holes and through matching bolt holes in a tooling detail on said conveyor frame.

4. The tooling jig system of claim 1 further comprising means for detecting a proximity of said conveyor frame to an initial end-of-travel position thereof relative to said alignment frame.

5. The tooling jig system of claim 4 wherein said means for detecting detects a proximity of said conveyor frame along each one of plural mutually orthogonal directions.

6. The tooling jig system of claim 5 further comprising means for recording successive proximity deviations from an initial end-of-travel position of said conveyor frame relative to said alignment frame.

7. The tooling jig system of claim 4 further comprising clamp means for fastening said conveyor frame to its end-of-travel position relative to said alignment frame.

8. The tooling jig system of claim 7 further comprising means responsive to said proximity detecting means for disabling said clamp means upon detection of an out-of-tolerance end-of-travel position.

9. The tooling jig system of claim 1 further comprising a floor fastened to said alignment frame and means for generating a downdraft across working planes of said alignment frame and for collecting said downdraft in said floor and filtering out contamination therein.

10. The tooling jig system of claim 9 further comprising means for tilting said floor upwardly to expose said means for filtering, and wherein said means for filtering is removable.

11. The tooling jig system of claim 1 further comprising movable jacks supporting said magazine and alignment frame, a level sensor attached to said alignment frame and means for adjusting said movable jacks so as to null an error signal generated by said level sensor.

12. The tooling jig system of claim 1 wherein said end-of-travel position is on a side of said alignment frame opposite said magazine, said system further comprising a second magazine having a conveyor guide therein aligned with and merging with said conveyor guide of said alignment frame, said second magazine comprising:
   a second conveyor frame including second guide means for confining movement of said second conveyor frame along a line of travel coincident with the conveyor guides of said second magazine and alignment frame during travel of said second conveyor frame from said second magazine to said alignment frame,
   plural fiducial fastening devices at spaced locations on said second conveyor frame, and
   means for moving said second conveyor frame from a starting location in said second magazine to an end-of-travel location in said alignment frame.

13. The tooling jig system of claim 12 wherein tooling details are insertable through open tops of the first and second magazines, whereby a tooling detail from one magazine is positionable facing said alignment frame while a tooling detail is replaceable in the other magazine.

14. The tooling jig system of claim 1 wherein tooling details are insertable and removable through an open top of said magazine.

\* \* \* \* \*